(No Model.)

H. S. BAILEY.
ANTI FRICTION BEARING.

No. 328,176. Patented Oct. 13, 1885.

Attest:
Count A. Cooper.
Wm. J. Sayers.

Howard S. Bailey
Inventor:
by
Foster & Freeman
atty.

UNITED STATES PATENT OFFICE.

HOWARD S. BAILEY, OF DENVER, COLORADO.

ANTI-FRICTION BEARING.

SPECIFICATION forming part of Letters Patent No. 328,176, dated October 13, 1885.

Application filed April 13, 1885. Serial No. 162,096. (No model.)

*To all whom it may concern:*

Be it known that I, HOWARD S. BAILEY, a citizen of the United States, residing at Denver, in the county of Arapahoe and State of Colorado, have invented a new and useful Improvement in Anti-Friction Bearings; and I do hereby declare that the following is a specification thereof.

My invention has for its object to connect a wheel or wheels to a shaft in such manner as to permit them to turn thereon with a minimum of friction and permit their ready detachment; and my invention consists in providing the shaft with a groove or grooves, and each wheel with a recess to receive the shaft, and an opening to receive a roller fitting a groove in the shaft, and with a retaining-plug, all as fully set forth hereinafter, and illustrated in the accompanying drawings, in which—

Figure 1:
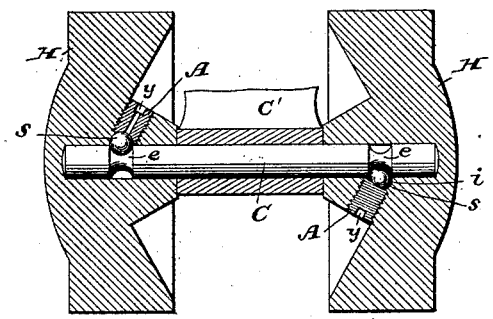
Figure 2:
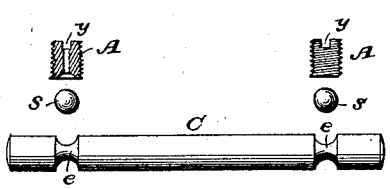
Figure 3:
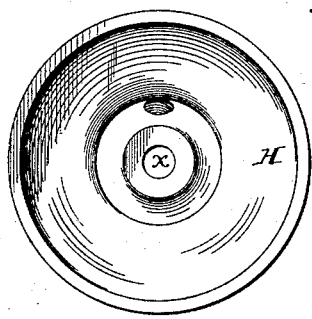
Figure 4:
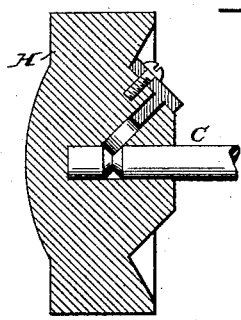

Figure 1 is a cross-section illustrating my improved anti-friction bearing in connection with rollers adapted for roller-skates. Fig. 2 is a detached view of the shaft, anti-friction rollers, and plugs, one of the latter being in section. Fig. 3 is an inside face view of one of the wheels. Fig. 4 is a section illustrating a modification.

C represents the shaft or spindle or axle, which is mounted in a suitable support, C', through which the shaft extends, and in which it may be secured immovably, or so as to turn freely. The support C' may be a bracket attached to a roller-skate, or any other suitable support, according to the structure in which the parts are to be used.

The ends of the shaft extend into openings in the hubs of wheels H H, which may be pulleys, or, as shown, may constitute the wheels of a roller-skate, the openings or sockets $x$ extending from the inside into the hub, but not through the wheel, and the latter fitting the shaft so as to turn thereon freely.

Near each end of the shaft C is an annular curved groove or recess, $e$, and in the hub of each roller is an inclined threaded opening, $i$, adapted for the reception of a screw-plug, A, and so situated as, when the shaft is in place, to extend from the groove outward. The inner end of the screw-plug A is curved to a degree corresponding to that of the groove $e$, and the curvature of each corresponds to that of a metallic sphere, $s$, which fits the two recesses when the parts are in place, as shown in Fig. 1.

In putting the parts together the plug A is removed from each wheel, and one end of the shaft C is introduced into the socket $x$. The sphere $s$ is then dropped through the opening $i$ until it rests in the adjacent groove, $e$, and the screw-plug A is then introduced into the opening $i$ and turned until it bears upon the sphere, after which it is turned backward to a slight extent, so as to permit the sphere $s$ to revolve freely. The other end of the shaft is then passed through the support C', and the other wheel is then applied to said end in like manner as the first.

While each wheel may turn freely upon the end of the shaft, it cannot be withdrawn therefrom, owing to the presence of the sphere in the groove $e$. While each wheel is thus held firmly in place, and while it will turn upon the axle, its revolution results in but little friction, inasmuch as there is no frictional bearing upon the retaining-spheres unless there is a force tending to carry the wheel outward away from the end of the axle. In this case the side of the groove $e$ takes its bearing upon the sphere, and in case the axle revolves with the wheel the sphere remains in its place stationary; but when the axle is stationary, or moves slower than the wheel, then the sphere revolves as it is carried round the axle by the wheel, so that there is but little or no friction, but a rolling body placed between the two surfaces. There is no pressure upon the sphere when the wheel is thrust inward, as the hub then takes its bearing against the side of the support C'. As the balls or bearing-surfaces wear away this wear is compensated for by screwing inward the plug A.

To facilitate the oiling of the parts subjected to the greatest wear, I make a channel, $y$, through the plug A, through which the oil may be passed to the sphere and bearing-faces.

The anti-friction roller $s$, while preferably of a spherical form, may be of other shape—for instance, it may be a disk introduced through a slot in the hub of the wheel, and confined in place by a suitable cap-plate, as shown in Fig. 4.

Inasmuch as the sockets for the reception of the ends of the shaft extend only partly through the wheels, the lubricating material cannot pass to the outside of the latter, and there are no projections upon the outside of the wheels, thereby avoiding the danger of soiling and catching upon the clothing of the wearer or others, incident to the usual constructions employed in connection with roller-skates.

The above-described anti-friction bearing and attachment is peculiarly adapted for use in connection with roller-skates, inasmuch as the shaft can turn with both the wheels when the latter are revolving at the same speed, while either wheel can rotate independently of the shaft when necessary in turning curves, &c.

While I have referred to the plug A as a screw-plug, it is obvious it may be inserted in the socket or opening *i* and secured by any suitable independent device—as, for instance, a cap-plate—as shown in Fig. 4. It will also be evident that two or more plugs and spheres or rollers may be used in connection with each wheel.

Without limiting myself to the precise construction and arrangement of parts shown and described, I claim—

1. The combination, in an anti-friction bearing, of a shaft turning in a support and provided with an annular recess, a wheel adapted for the reception of the end of the shaft, and perforated for the passage of a roller fitting the groove in the shaft, and a retaining device, substantially as described, for holding the roller in its position, substantially as set forth.

2. The combination of a support, a shaft extending through the support and provided with an annular groove, and a wheel turning upon the end of the shaft and carrying a roller fitting said annular groove, the said roller being detachable from the wheel, substantially as set forth.

3. The combination, with the support, of an axle grooved near each end, and wheels, each having a socket inclosing the end of the shaft and carrying a roller confined in the groove of the shaft, substantially as set forth.

4. The combination, with the grooved shaft and its support, of wheels having inclined threaded sockets for screw-plugs A, recessed at their inner ends, and spheres confined between the ends of the screw-plugs and the faces of the grooves in the shaft, substantially as described.

5. The combination of the support, the axle turning therein and grooved near the ends, the wheels fitting the ends of the axle, and having inclined sockets and spheres within said sockets, and detachable plugs for holding the spheres in place, substantially as set forth.

6. The combination, with the support, grooved axle, wheel, and sphere, of a detachable perforated plug, for the purpose set forth.

7. The combination, with the grooved axle, of a socketed wheel having an inclined opening, a sphere or roller, and a retaining-plug fitting said opening, substantially as set forth.

8. The combination of the grooved axle and roller and a wheel having an inclined opening receiving said roller, and a detachable threaded retaining-plug fitting said opening, substantially as forth.

In testimony whereof I have signed my name to this specification in the presence of two subscribing witnesses.

HOWARD S. BAILEY.

Witnesses:
FRANK W. WHITE,
CHARLES R. PIERCE.